United States Patent

[11] 3,633,475

[72] Inventor Dexter P. Cooper, Jr.
Pasadena, Calif.
[21] Appl. No. 814,712
[22] Filed Apr. 9, 1969
[45] Patented Jan. 11, 1972
[73] Assignee Bell & Howell Company
Chicago, Ill.

[54] INFORMATION DISPLAY APPARATUS
12 Claims, 8 Drawing Figs.

[52] U.S. Cl. ....................................... 95/11 R,
95/10 C, 95/64 D, 352/141
[51] Int. Cl. ................................................. G03b 17/20
[50] Field of Search............................................. 95/11, 11
V, 64 D, 10 C; 352/141; 40/132 E

[56] References Cited
UNITED STATES PATENTS
2,300,447 11/1942 Glukes ........................ 40/132 E
3,050,888 8/1962 Myers et al. ................... 40/132 E
2,996,968 8/1961 Lunzer .......................... 95/10 C X
3,033,094 5/1962 Stimson et al. ................ 95/10 C X
3,091,167 5/1963 Estes ............................. 88/1.5 UX
3,292,517 12/1966 Eagle et al. .................... 352/141 X Primary Examiner—Samuel S. Matthews
Assistant Examiner—Robert P. Greiner
Attorney—David Weiss ABSTRACT: Apparatus for monitoring a camera iris and for producing in the camera viewfinder visible displays of information concerning the size of the iris aperture. Red indicia are displayed within nearly the entire field of the viewfinder when available ambient light is insufficient to produce satisfactory film exposures, and green indicia are less conspicuously displayed in the camera's viewfinder at other times.

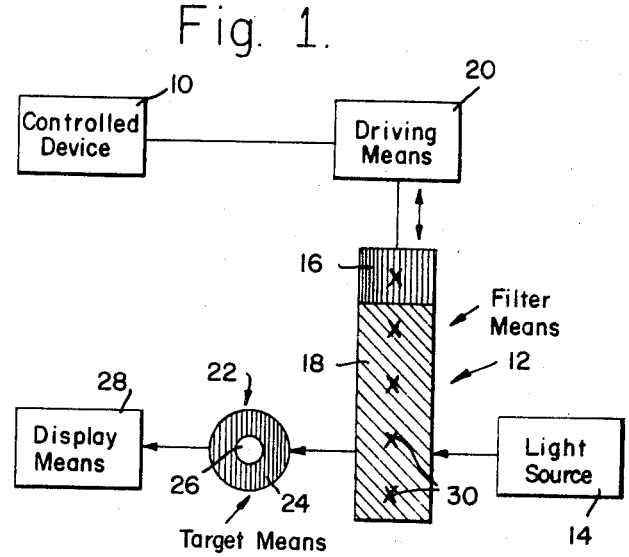
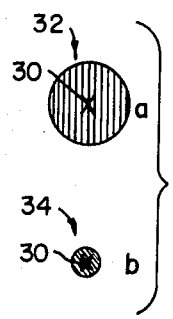
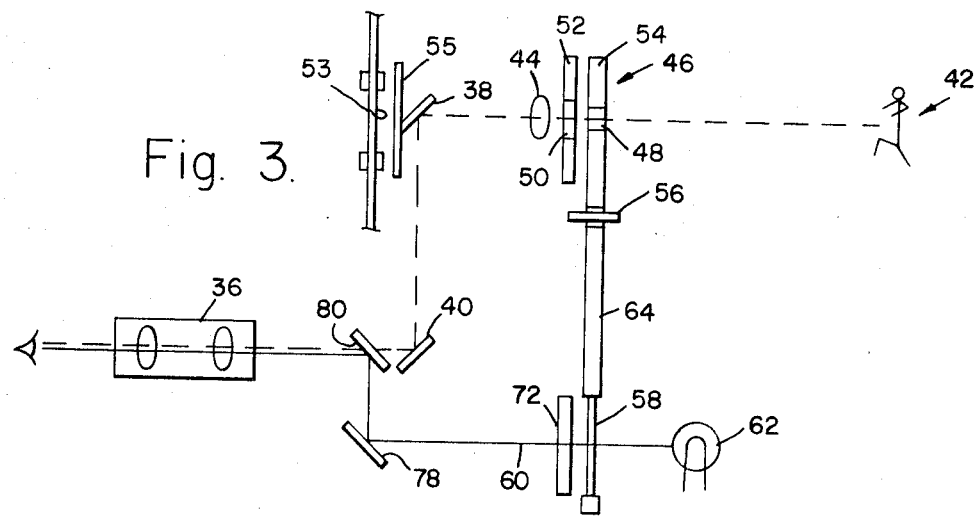
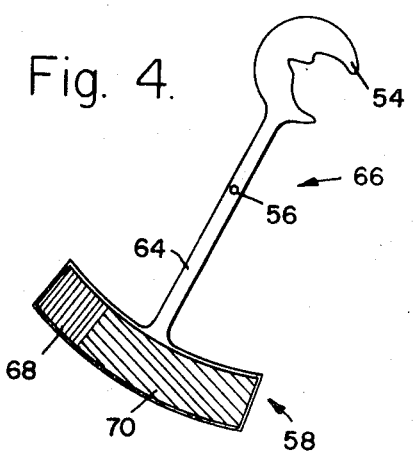
Dexter P. Cooper, Jr.,
INVENTOR.

Dexter P. Cooper, Jr.,
INVENTOR.
BY.

ATTORNEY.

INFORMATION DISPLAY APPARATUS

FIELD OF THE INVENTION

This invention relates to information display apparatus, and more particularly to such apparatus in combination with a camera for monitoring iris disposition and for vividly displaying conditions of ambient light levels which are insufficient to produce satisfactory film exposures.

BACKGROUND OF THE INVENTION

In the operation of many types of equipment, it is often advantageous that indications of adverse operating conditions be displayed in a manner distinguished from indications of acceptable conditions. In electrical equipment, for example, parameters such as current, voltage or power used by an electrical apparatus, are often monitored and can be displayed in such manner that information concerning the approaching of overload conditions is markedly distinguished from indications of acceptable parameter conditions. Automobile speeds exceeding local speed limits, accelerometer outputs approaching or exceeding structural vibration ratings, fuel gauge indications approaching fuel exhaustion, electrical generator operation below acceptable current generation levels, are examples of other conditions for which it is desirable to display indications thereof in a manner markedly distinguished from correspondingly acceptable conditions.

In photography, it is especially advantageous that a photographer be informed of certain conditions affecting the picture taking capability of his camera, such as an insufficiency of available light to properly expose the film, the number of film frames either exposed or remaining (for still picture cameras), and the length of unexposed film remaining (for motion picture cameras). In motion picture photography, particularly, awareness of these conditions should be continuous during the time interval that a length of film is being exposed. One method of providing such continuous awareness is to visibly display information relating to such conditions in the camera's viewfinder, so that the photographer need not remove his eye from the viewfinder during the picture taking.

Information relating to the various conditions affecting a camera's picture taking capability can be obtained by monitoring the disposition of corresponding camera components or devices. In "automatic" cameras, for example, photoelectric apparatus is provided for automatically adjusting the camera's iris to admit an optimum amount of the ambient light for proper film exposure. When the ambient light level is so low that the iris is driven to exceed its maximum practical aperture size, there is obviously insufficient available light to produce an adequately exposed photograph. Unless the photographer is aware of this condition, he will proceed to operate his camera, a situation which can result in a most frustrating experience when he attempts to view his developed film.

SUMMARY OF THE INVENTION

The present invention has application wherever it is desired to produce markedly distinguishable visible displays of information concerning respective preselected ranges of the control status of a controlled device. As used herein, the term "controlled device" is applied to any device which is regulated or controlled to respond in a particular manner to suitable control forces or manual regulation. The term "control status of the device" refers to the disposition or state of the device in response to the applied control forces.

According to the present invention, visible indicia characterized by a first color (such as red) is displayed when the device is being controlled within a first preselected control range, such as a range which is unacceptable in any manner. Different visible indicia characterized by a second color (such as green) is alternatively displayed at other times, or when the device is being controlled within a second preselected (acceptable) control range.

In order to produce these markedly distinguishable displays, target means having first and second target portions is positioned in the optical path of a provided light source. The first target portion is characterized by its ability to transmit (or reflect) light having a first predetermined spectral composition (such as red) and for absorbing light having a second predetermined spectral composition (such as green). The second target portion can transmit (or reflect) light of either the first or second predetermined spectral compositions, or in an alternative target embodiment, the second target portion can transmit (or reflect) light having the first spectral composition and absorb light having the first spectral composition.

Filter means are provided in the optical path, such as between the light source and the target means. The filter means includes a first filter portion for filtering the light to have the first predetermined spectral composition when intercepting the light from the light source, and a second filter portion for filtering light to have the second predetermined spectral composition when intercepting the light.

The filter means is driven across the optical path by suitable driving means which is coupled to the controlled device and responsive to status changes of the device. Accordingly, the first filter portion intercepts the light from the light source when the device is controlled within the first preselected control range, and the second filter portion intercepts the light at other times or when the device is controlled within the second preselected control range. During the first control range, therefore, only light having the first predetermined spectral composition (such as red) is transmitted by the filter-target combination; during the second control range, only light having the second predetermined spectral composition (such as green) is transmitted by the filter-target combination. The transmitted light is visibly displayed by suitable display means optically coupled to the target means.

If desired, alphanumeric indicia can be included in the display, by superimposing suitable colored or opaque alphanumeric indicia on either or both target portions. In addition, the filter means can include opaque indicia arranged thereon to be aligned with the transmitting target portion as the filter means traverses the optical path.

In accordance with a preferred embodiment of display apparatus of the present invention, a camera iris is monitored, and information concerning the iris aperture size is displayed in the camera's viewfinder. In order to assure awareness by the photographer of adverse ambient light conditions, information relating to a first preselected control range (e.g., iris aperture sizes corresponding to insufficient available light) is displayed in a manner vividly distinguished from information relating to a second preselected control range (e.g., iris aperture sizes corresponding to sufficient light).

The filter means is coupled to an iris blade, such that a red filter (i.e., a filter through which all transmitted light exhibits a red color) is interposed between a lamp and the target when the iris aperture has exceeded its maximum practical size. Alternatively, a green filter is interposed between the lamp and the target when the iris aperture size is controlled within an acceptable range.

The first light transmitting target portion is colored red, while the second light transmitting target portion can be uncolored, or alternatively can be colored green. Accordingly, red indicia are displayed in the viewfinder at times when the iris aperture is unacceptably large, and green indicia are displayed at other times.

BRIEF DESCRIPTION OF THE DRAWINGS

The novel features which are believed to be characteristic of the invention, together with further advantages thereof, will be better understood from the following description considered in connection with the accompanying drawings in which the invention and a preferred embodiment thereof are illustrated by way of example. It is to be expressly understood, however, that the drawings are for the purpose of illustration and description only, and are not intended as a definition of the limits of the invention.

FIG. 1 is a block diagram illustrating the invention;

FIG. 2 shows elevation views illustrating the general nature of visible displays produced by the invention;

FIG. 3 is a schematic diagram of a preferred embodiment of apparatus according to the present invention, for producing in a camera viewfinder visible displays of information concerning the size of an iris aperture;

FIG. 4 is a front view of an iris blade modified to drive the filter means of the preferred embodiment shown in FIG. 3;

DETAILED DESCRIPTION OF THE INVENTION

Figure 5:
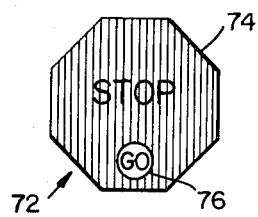
FIG. 5 is a possible target configuration for utilization in the preferred embodiment of FIG. 3.

Turning first to FIG. 1, the present invention is illustrated in block form, in combination with a controlled device 10. Although the present invention has broad application for combination with any type of controlled device 10, as previously discussed, in camera systems the controlled device can be an iris which can be controlled by suitable photoelectric means, or a film frame or footage indicator device which is controlled according to the amount of film used or unused.

Filter means 12 is positioned in the optical path of light provided by a light source 14, and includes a first filter portion 18 for filtering the light to have a first predetermined spectral composition when the first filter portion 16 intercepts the light. The filter means 12 further includes a second filter portion 18 for filtering the light to have a second predetermined spectral composition when the second filter portion 18 intercepts the light. Ordinarily, the first and second filter portions 16, 18 are arranged in juxtaposed relation.

As indicated by the type of shading in the drawing, the first filter portion 16 is a red color, while the second filter portion 18 is a green color, although these colors can be reversed if desired. Furthermore, other color combinations can be utilized for the two filter portions 16, 18, such as blue and yellow, respectively.

Driving means 20, coupling the control device 10 and the filter means 12 is responsive to control changes of the device 10 for driving the filter means 12 to traverse the optical path such that the first filter portion intercepts the light at times when the device 10 is controlled within a preselected control range. At these times, the filtered light transmitted by the filter means 12, has the first predetermined spectral composition (e.g., red filtered light is transmitted by the filter means 12).

At other times, corresponding to times when the device 10 is controlled within a second preselected control range, the driving means 20 drives the filter means 12 such that the second filter portion 18 intercepts the light. At such times, the filtered light has the second predetermined spectral composition (e.g., green filtered light is transmitted by the filter means 12).

Target means 22 is situated in the optical path, either before or after the filter means 12. The target means 22 includes a first target portion 24 which transmits filtered light of the first predetermined spectral composition and absorbs light of the second predetermined spectral composition. For the indicated color examples, the first target portion 24 is red.

The target means 22 further includes a second target portion 26 which, preferably, transmits filtered light of the first predetermined spectral composition as well as light of the second predetermined spectral composition. In this case, the second target portion is preferably clear or uncolored.

Alternatively, the second target portion 26 can transmit light of the second predetermined spectral composition and absorb light of the first predetermined spectral composition, and in the example given, can be colored green. It should be realized that one target portion need not be enclosed within the other; for example, the two target portions 22, 24 can be physically separated, in which case they can be the same size if desired.

The filtered light ultimately transmitted by the filter-target combination 12, 22 is visibly displayed by suitable display means 28. The type of display means 28 utilized depends, of course, upon the nature of the display desired by the circumstances.

If it is desired that the display include indicia corresponding to intermediate dispositions of the controlled device 10, the filter means 12 can include opaque alphanumeric indicia 30 corresponding to such dispositions. The indicia 30 are arranged on the filter means 12 to be correspondingly aligned with the second target portion 26 for indicating the respective dispositions of the controlled device 10.

The alternative visible displays of filtered light transmitted by the configuration of the target means 22 of FIG. 1, are indicated in FIG. 2. During times when the first filter portion 16 intercepts the light, a red display 32 is produced as shown in FIG. 2a, since both the first and second target portions 24, 26 are transmitting the red filtered light. During other times, green filtered light is transmitted by the second target portion 26 and absorbed by the first target portion 24, so that a smaller green display 34 is produced as shown in FIG. 2b. If opaque indicia 30 are present on the filter means 12, they will correspondingly appear in the displays 32, 34.

Turning next to FIG. 3, the preferred embodiment of apparatus according to the present invention is shown in combination with a camera having a viewfinder comprising, for example, an eyepiece 36 and viewfinder mirrors 38, 40, for viewing an image of an object scene 42 produced by a camera lens 44. The camera further includes an iris 46 for varying the size of an iris aperture 48 to regulate the amount of ambient light transmitted through an aperture 50 in an aperture plate 52 positioned in front of the lens 44 (i.e., to change the f/number of the lens 44, or the ratio of the lens focal length to its effective diameter). Exposure of film 53, of course, occurs upon operation of a shutter 55.

The camera iris 46 can be of any conventional type, such as one or more iris blades 54 of the type shown in FIGS. 3 and 4, controllably driven about a pivot member 56 to vary the size of the iris aperture 48. This type of iris blade 54 is extensively utilized in amateur motion picture cameras, and its rotation about the pivot member 56 is controlled by photoelectric means (not shown) which receives the light admitted by the iris and plate apertures 48, 50 and drives the iris to maintain an optimum light level determined by the type of film 54 used and the duration of film exposure (or camera speed).

When the iris 46 is controlled such that the iris aperture 48 is larger than the plate aperture 50, the amount of light admitted by the plate aperture 50 does not further increase. In such circumstances, the optimum light level cannot be reached with the available ambient light, and satisfactory film exposures are not possible. By the preferred embodiment of the present invention, this condition is vividly displayed in the camera's viewfinder.

Since the iris blade 54 is controlled to rotate about the pivot member 56, the mechanical rotation thereof can be utilized to drive filter means 58 to traverse an optical path 60 of light generated by an incandescent lamp 62. Accordingly, the filter driving means of the preferred embodiment is a rigid extension 64 of the iris blade 54—so that the filter means 58 is mechanically coupled to the iris blade 54, or attached to a modified iris blade 66, shown more clearly in FIG. 4.

As indicated in FIG. 4, the filter means 58 includes a red filter 68 and a green filter 70, juxtaposed with respect to one another. The two filters 68, 70 are arranged on the modified iris blade 66 such that the red filter 68 intercepts the optical path 60 (FIG. 3) during times when the size of the iris aperture 48 has exceeded the size of the plate aperture 50, so that the light transmitted by the filter means 58 has a spectral composition substantially corresponding to the color red.

Alternatively, during times when the iris aperture 48 is smaller than the plate aperture 50, the green filter 70 intercepts the optical path 60, filtering the light transmitted by the filter means 58 to have a spectral composition substantially corresponding to the color green.

Returning to FIG. 3, a light-transmitting target member 72 is situated in the optical path 60 for receiving the filtered light from the filter means 58. A preferred configuration of the target member 72 is shown in FIG. 5, and can be in the form of the familiar, red octagonal "stop sign" 74 having the word stop superimposed thereon in red-absorbing letters (such as either black or green). The target member 72 further includes an uncolored portion 76 which can have superimposed thereon the word go in green-absorbing, red-transmitting letters (such as red).

The visible patterns of colored light transmitted by the target member 72 are displayed in the camera's viewfinder, for example by means of a folding mirror 78 (FIG. 3) and a semimirror 80 (which also transmits the object scene image) reflecting the target light to the viewfinder eyepiece 36. The length of the optical path 60 from the target member 72 to the viewfinder eyepiece 36 should be substantially equal to the length of the optical path distance from the camera's focal plane (as reflected by the shutter mirror 38) to the eyepiece 36, so that both the object scene image and the target member 72 are focused in the viewfinder display.

Figure 6:
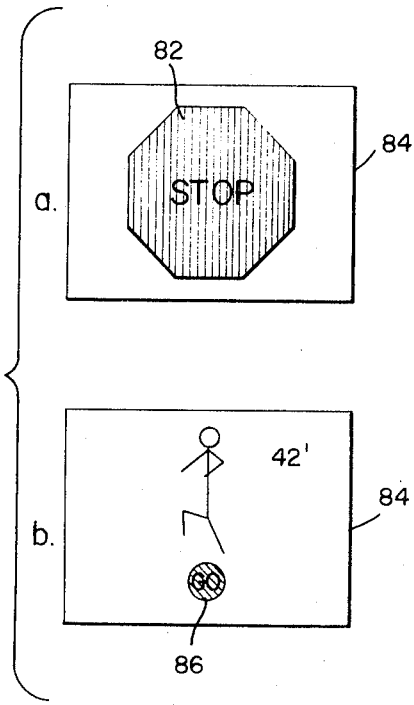
FIG. 6 shows elevation views of the displays viewable in the camera viewfinder when using the target configuration shown in FIG. 5.

The displays produced by the red and green filtered light through the target member 72 of FIG. 5, viewable in the camera's viewfinder, are indicated in FIG. 6. When the target member 72 is transilluminated by red filtered light, the red target portion 72 (including the red go) transmits red light, as does the uncolored portion 76, but the black or green stop is opaque to red light. The resulting display, as shown in FIG. 6a, is a red "stop sign" 82 included within a viewfinder field 84 and superimposed upon nearly the entire object scene image.

When the target member 72 is transilluminated by green filtered light, the red portions are opaque to the green filtered light while the uncolored portion 76 transmits the green light. The resulting display, as shown in FIG. 6b, is a small green area 86 with the word go in black letters. In the preferred target configuration of FIG. 5, the uncolored target portion 76 is arranged so that the small green area 86 (FIG. 6b) is at or near the lower portion of the viewfinder field 84 so that most of the object scene image 42' remains visible in the viewfinder.

Figure 7:
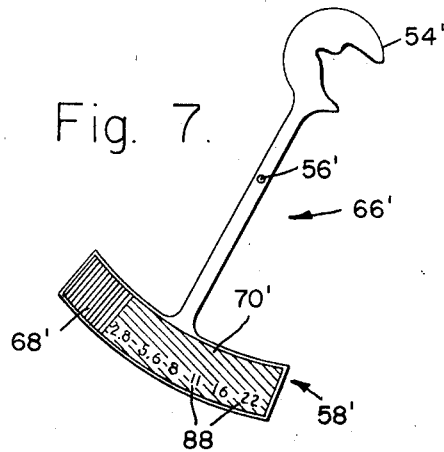
FIG. 7 is a front view of the modified iris blade of FIG. 4, where the filter means is modified to display corresponding lens f/numbers.

Turning next to FIG. 7, wherein primed reference numerals indicate components similar to those of FIG. 4, the green filter 70' includes opaque indicia thereon corresponding to lens f/numbers. The filter means 58' traverses the light path in response to changes in iris aperture size, and the f/numbers are arranged on the green filter 70' so that they are correspondingly aligned with the uncolored target portion 76 (FIG. 5) which in this case, of course, does not include the work go superimposed thereon. The filter means 58' should be adjacent to the target member 72, however, so that both the target member 72 and an appropriate f/number 88 are focused in the viewfinder display.

Figure 8:
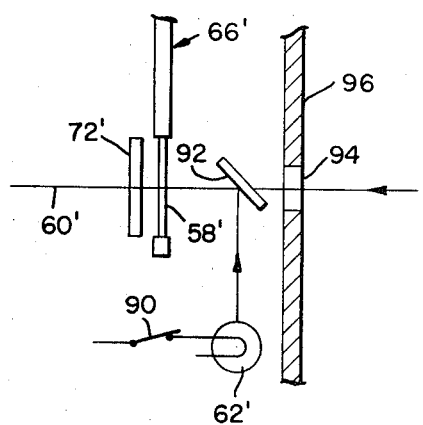
FIG. 8 is a schematic diagram of a modified portion of the preferred embodiment shown in FIG. 3.

FIG. 8 illustrates a modification of the preferred embodiment of the present apparatus, wherein primed reference numerals indicate components similar to those of FIG. 4. The modification includes the addition of a normally nonconducting switching means 90 which assumes a conducting state (for example, upon suitable actuation by the modified iris blade 66') only during times when the iris aperture has exceeded its practical maximum size. When the switching means 90 is in its conducting state, the incandescent lamp 62' generates light which is reflected along the optical path 60' by a semimirror 92. A window 94 is provided in the camera's housing 96, and is aligned with the optical path 60' for admitting ambient light to be transmitted by the semimirror 92.

Accordingly, during times when the filter means 58' intercepts the optical path 60' for transmitting red filtered light, the lamp 62' supplies the light thereto, while only ambient light is supplied during times when the filter means 58' intercepts the optical path 60' to transmit green filtered light. A more abrupt indication of insufficient ambient light conditions is therefore provided by this modification, in addition to the obvious conservation of the camera's batteries.

Thus, there has been shown a preferred embodiment of information display apparatus for distinguishably displaying acceptable and unacceptable conditions, including modifications thereof. Although the preferred embodiment described herein is utilized with a camera for monitoring iris disposition and for vividly displaying conditions of ambient light levels which are insufficient to produce satisfactory film exposures, it should be recalled that the breadth of the application of the present invention is not so limited. Other modifications of the embodiment herein presented, as well as other embodiments of the invention, may be developed without departing from the essential characteristics thereof.

Accordingly, the invention should be limited only by the scope of the claims listed below.

What is claimed is:

1. An information display apparatus comprising:
   a controlled device;
   light source means for providing light along an optical path;
   display means;
   target means in said optical path and optically coupled to said display means, said target means including first and second portions respectively responsive to light having first and second predetermined spectral compositions for producing alternative displays at said display means;
   filter means in said optical path, including
   a first filter portion for filtering said light to have said first predetermined spectral composition when said first filter portion intercepts said light, and
   a second filter portion for filtering said light to have said second predetermined spectral composition when said second filter portion intercepts said light; and
   driving means coupling the device and said filter means, said driving means being responsive to status changes of said device for driving said filter means to traverse said optical path such that said first filter portion intercepts said light at times when said device is controlled within a preselected control range and said second filter portion intercepts said light at other times.

2. An information display apparatus comprising:
   a controlled device;
   light source means for providing light along an optical path;
   display means;
   target means in said optical path and optically coupled to said display means, said target means including first and second portions respectively responsive to light having first and second predetermined spectral compositions for producing alternative displays at said display means; and
   filter means in said optical path and including first and second filter portions, said filter means being coupled to the device in such manner that said first filter portion intercepts said optical path for filtering said light to have said first predetermined spectral composition at times when said device is controlled within a first preselected control range and said second filter portion intercepts said optical path for filtering said light to have said second predetermined spectral composition at times when said device is controlled within a second preselected control range.

3. In combination with a controlled device, apparatus for displaying information concerning control status of the device, comprising the combination of:
   light source means for providing light along an optical path;
   target means in said optical path, including
   a first target portion for transmitting light having a first predetermined spectral composition and for absorbing light having a second predetermined spectral composition, and
   a second target portion for transmitting light having said first predetermined spectral composition and for transmitting light having said second predetermined spectral composition;

filter means in said optical path, including
   a first filter portion for filtering said light to have said first predetermined spectral composition when said first filter portion intercepts said light, and
   a second filter portion for filtering said light to have said second predetermined spectral composition when said second filter portion intercepts said light;

driving means coupling the device and said filter means, said driving means being responsive to status changes of the device for driving said filter means to traverse said optical path such that said first filter portion intercepts said light at times when the device is controlled within a preselected control range and said second filter portion intercepts said light at other times; and display means optically coupled to said target means for providing a visible display of light transmitted by said target means.

4. The apparatus according to claim 3, above, wherein said filter means includes opaque alphanumeric indicia corresponding to the control status of the device and arranged thereon to correspondingly superimpose said second target portion.

5. The apparatus according to claim 3, above, wherein said first target portion further includes opaque indicia superimposed thereon.

6. The apparatus according to claim 3, above, wherein said second target portion further includes indicia superimposed thereon for transmitting light having said first spectral composition and for absorbing light having said second spectral composition.

7. In a camera having a viewfinder and an iris, apparatus for producing in the viewfinder visible displays of information concerning the size of the iris aperture, comprising the combination of:

light source means for providing light along an optical path;
   target means in said optical path for producing first visible indicia in response to light having a first predetermined spectral composition, and alternatively for producing second visible indicia in response to light having a second predetermined spectral composition;
   filter means in said optical path, said filter means including first and second filter portions and coupled to the iris in such manner that said first filter portion intercepts said optical path for filtering said light to have said first predetermined spectral composition at times when the iris is disposed to provide an aperture within a first preselected size range, and said second filter portion intercepts said optical path for filtering said light to have said second predetermined spectral composition at times when the iris is disposed to provide an aperture within a second preselected size range; and
   display means optically coupled to said target means for providing displays of said first and second visible indicia.

8. In a camera having a viewfinder and an iris, apparatus for producing in the viewfinder visible displays of information concerning the size of the iris aperture, comprising the combination of:

light source means for providing light along an optical path;
   target means in said optical path, including
      a first target portion for transmitting light having a first predetermined spectral composition and for absorbing light having a second predetermined spectral composition, and
      a second target portion for transmitting light having said first predetermined spectral composition and for transmitting light having said second predetermined spectral composition;
   filter means in said optical path, including
      a first filter portion for filtering said light to have said first predetermined spectral composition when said first filter portion intercepts said light, and
      a second filter portion for filtering said light to have said second predetermined spectral composition when said second filter portion intercepts said light:
   means coupling the iris and said filter means and responsive to changes in size of the iris aperture, for driving said filter means to traverse said optical path such that said first filter portion intercepts said light at times when the iris is controlled to provide an aperture within a preselected size range and said second filter portion intercepts said light at other times; and
   optical means between said target means and the viewfinder, for providing a visible display in the viewfinder of light transmitted by said target means.

9. The apparatus according to claim 8, above, the camera including a housing, wherein said light source means includes:
   window means in the housing for admitting ambient light along said optical path;
   lamp means for generating light along said optical path; and
   switching means adapted to be actuated by the iris for controlling said lamp to generate light along said optical path when the iris aperture is within said preselected size range.

10. The apparatus according to claim 8, above, wherein said first target portion further includes opaque alphanumeric indicia superimposed thereon.

11. The apparatus according to claim 8, above, wherein said second target portion further includes alphanumeric indicia superimposed thereon for transmitting light having said first spectral composition and for absorbing light having said second spectral composition.

12. The apparatus according to claim 8, above, wherein said filter means traverses said optical path in response to changes in iris aperture size, and said second filter portion includes opaque alphanumeric indicia corresponding to iris aperture size and arranged thereon to correspondingly superimpose said second target portion.

* * * * *